United States Patent [19]

Hines et al.

[11] Patent Number: 5,160,080
[45] Date of Patent: Nov. 3, 1992

[54] GAS TURBINE ENGINE AND METHOD OF OPERATION FOR PROVIDING INCREASED OUTPUT SHAFT HORSEPOWER

[75] Inventors: William R. Hines, Montgomery; William M. Farrell, Cincinnati, both of Ohio

[73] Assignee: General Electric Company, Cincinnati, Ohio

[21] Appl. No.: 590,723

[22] Filed: Oct. 1, 1990

[51] Int. Cl.$^5$ .............................................. F02C 6/00
[52] U.S. Cl. ........................... 60/39.04; 60/39.161; 60/39.75; 60/751
[58] Field of Search ............... 60/39.04, 39.161, 39.75, 60/751

[56] References Cited

U.S. PATENT DOCUMENTS

| | | | |
|---|---|---|---|
| 3,673,802 | 7/1972 | Krebs et al. | 60/226 |
| 4,185,203 | 1/1980 | Takeuchi | 290/40 C |
| 4,192,137 | 3/1980 | Chappell et al. | 60/39.161 |
| 4,206,593 | 6/1980 | Su et al. | 60/39.04 |
| 4,222,233 | 9/1980 | Johnson et al. | 60/225 |
| 4,421,989 | 12/1983 | Brannstrom | 290/40 R |
| 4,529,887 | 7/1985 | Johnson | 290/40 R |
| 4,590,384 | 5/1963 | Bronicki | 290/4 C |
| 4,624,104 | 11/1986 | Stroem | 60/39.75 |
| 4,631,914 | 12/1986 | Hines | 60/39.05 |
| 4,813,226 | 3/1989 | Grosselfinger et al. | 60/39.2 |
| 4,896,499 | 1/1990 | Rice | 60/39.161 |

Primary Examiner—John J. Vrablik
Assistant Examiner—Charles Freay
Attorney, Agent, or Firm—Jerome C. Squillaro; James P. Davidson

[57] ABSTRACT

A method of operating a gas turbine engine includes providing combustion gases to turbine means, and choking flow of the combustion gases for increasing shaft horsepower in an output shaft while reducing thermal efficiency of the gas turbine engine. The method may also include the step of supercharging the turbine means for further increasing output shaft horsepower. In accordance with an exemplary embodiment, a gas turbine engine effective for carrying out the method is disclosed. The engine includes an output shaft, compression means, combustion means, turbine means, and diffusion means for diffusing combustion gases discharged from the turbine means for obtaining choked flow for increasing shaft horsepower and reducing thermal efficiency. The compression means is effective for supercharging the turbine means at a predetermined speed of the output shaft for providing increased output shaft horsepower.

26 Claims, 2 Drawing Sheets

GAS TURBINE ENGINE AND METHOD OF OPERATION FOR PROVIDING INCREASED OUTPUT SHAFT HORSEPOWER

TECHNICAL FIELD

The present invention relates generally to gas turbine engines, and, more specifically, to aircraft gas turbine engines adapted for land-based and marine applications.

BACKGROUND ART

Marine and land-based industrial (M & I) gas turbine engines are frequently derived from engines designed for and used in various types of aircraft. Such marine and industrial gas turbine engines are used, for example, for powering marine vessels, electrical generators, and various types of pumping and compression applications.

The parent gas turbine engine of an M & I engine is typically designed and constructed to be lightweight and to operate at minimum specific fuel consumption (SFC) in an aircraft for predetermined thermodynamic cycles of operation having predetermined ranges of air and combustion gas flowrates, temperature, and pressure in the engine. The parent, or aircraft, engine cycles are also preselected for maximizing thermal and propulsive efficiency of the engine.

Development of an aircraft gas turbine engine requires a substantial amount of design, development, and testing resulting in substantial development costs. In designing gas turbine engines for marine and industrial applications, it has proved to be more cost-effective to modify an existing aircraft gas turbine engine in the desired power class, than to design the M & I engine from the beginning. Accordingly, it is desirable to minimize the changes in the aircraft engine required for obtaining a suitable M & I engine.

One application of an M & I engine is to provide peaking power for powering an electrical generator to provide additional electrical power to a utility power grid when the utility power demands exceed on-line baseload capacity. Accordingly, the utility industry desires relatively simple and inexpensive gas turbine engines which can be brought on line quickly and then shut down quickly as required to meet the peaking requirement. One goal is to generate the required power during peaking operation as efficiently as possible for reducing kilowatt-hour costs.

One factor in obtaining relatively low kilowatt-hour cost is the development costs for providing an industrial gas turbine engine for meeting the required power demands. In order to keep development costs relatively low, the industrial gas turbine engine typically utilizes the parent aircraft gas turbine engine and makes as few changes in the design thereof as practical for obtaining the desired land-based gas turbine engine. Accordingly, the parent aircraft gas turbine engine utilized for M & I applications may be adapted specifically for particular applications, including, for example, driving an electrical generator at a synchronous speed such as 3000 rpm or 3600 rpm, for generating electricity at 50 Hertz or 60 Hertz, respectively. Since electrical power generation is desired, and in particular, for meeting peaking utility demands, maximum output shaft horsepower from the gas turbine engine is desirable for maximizing the amount of electrical power generated by the generator.

OBJECTS OF THE INVENTION

Accordingly, one object of the present invention is to provide a new and improved gas turbine engine for marine and industrial applications.

Another object of the present invention is to provide a gas turbine engine and method of operation for providing increased output shaft horsepower.

Another object of the present invention is to provide a gas turbine engine derived from an aircraft gas turbine engine requiring relatively few changes for increasing output shaft horsepower therefrom.

Another object of the present invention is to provide an aircraft derivative gas turbine engine effective for powering an electrical generator at synchronous speed while maximizing output shaft horsepower.

DISCLOSURE OF INVENTION

A method of operating a gas turbine engine includes providing combustion gases to turbine means, and diffusing the combustion gases discharged therefrom for obtaining choked flow of the combustion gases for increasing shaft horsepower in an output shaft. The method preferably includes the additional step of supercharging the turbine means for further increasing output shaft horsepower. In accordance with an exemplary embodiment, a gas turbine engine effective for carrying out the method is disclosed. The engine includes an output shaft, compression means, combustion means, turbine means, and diffusion means for diffusing combustion gases discharged from the turbine means for obtaining choked flow for increasing shaft horsepower. The compression means is effective for supercharging the turbine means at a predetermined speed of the output shaft for providing increased output shaft horsepower.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawing in which:

MODE(S) FOR CARRYING OUT THE INVENTION

Figure 1:
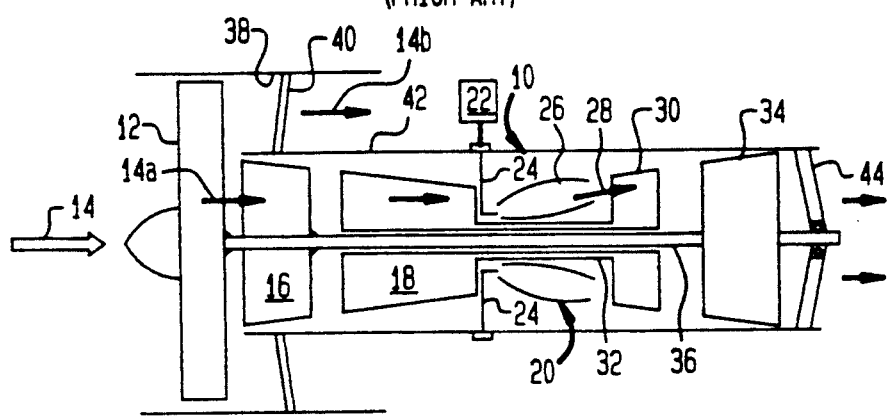
FIG. 1 is a schematic, centerline sectional view of an exemplary prior art aircraft turbofan gas turbine engine.

Illustrated in FIG. 1 is an exemplary turbofan gas turbine engine 10 designed for powering an aircraft in flight. The engine 10 is conventional and includes a fan 12 for receiving ambient airflow 14. A first portion 14a of the airflow 14 is channeled to a low pressure compressor (LPC), or booster compressor 16, wherein it is initially compressed and then channeled in turn to a high pressure compressor (HPC), or core compressor 18 from which it is discharged to a conventional combustion means 20.

The combustion means 20 conventionally includes means 22 for selectively providing fuel to a plurality of circumferentially spaced fuel injectors 24 for adding fuel to the airflow 14a compressed in the LPC 16 and the HPC 18. The combustion means 20 also includes a conventional combustor 26 wherein the fuel from the injectors 24 and the compressed airflow 14a are conventionally ignited for generating combustion gases 28 which are channeled to a conventional high pressure turbine (HPT), or first turbine 30.

The HPT 30 is operatively connected to the HPC 18 through a first rotor shaft 32 for rotation therewith. Disposed downstream of the HPT 30 is a conventional low pressure turbine (LPT), or second turbine 34. The LPT 34 is operatively connected to both the LPC 16 and the fan 12 through a second rotor shaft 36 for rotation therewith. The combustion gases 28 flow through the HPT 30 which extracts energy or power therefrom for driving the HPC 18, and then the combustion gases 28 discharged from the HPT are channeled through the LPT 34 for additionally extracting energy and power therefrom for driving both the LPC 16 and the fan 12.

A radially outer, second portion 14b of the airflow 14 is channeled from the fan 12 through a conventional bypass duct 38 for providing thrust for propelling an aircraft in flight. The bypass duct 38 is conventionally supported through a plurality of circumferentially spaced struts 40 fixedly connected to an annular casing 42 surrounding the LPC 16. The casing 42 extends axially downstream over the LPT 34 as a series of bolted casings (i.e., HPC, combustor, HPT and LPT casings), and the second rotor shaft 36 is conventionally supported at its aft end to the casing 42 through a plurality of circumferentially spaced conventional frame struts 44. A conventional conic nozzle or low area ratio converging-diverging nozzle (not shown) is typically used to generate thrust from the core flow.

Since the engine 10 is provided for a particular aircraft application, it is an existing aircraft engine design having predetermined design flowrate, temperature, and pressure characteristics throughout the engine for operating over various output power requirements ranging from low output power at engine idle to intermediate output power requirements at cruise operation of the aircraft, and at maximum power requirements at takeoff of the aircraft. The engine 10, therefore, is predeterminedly designed for operating over a range of output power and for minimizing specific fuel consumption by providing relatively high, or maximized, thermal and propulsive efficiency of the engine. The engine 10 typically operates over a range of rotor speeds, for example, the first rotor shaft 32 operates from about 780 rpm to about 3700 rpm, and the second shaft operates from about 6150 rpm to about 10850 rpm, corresponding with idle operation and maximum thrust operation of the engine 10.

Accordingly, the engine 10 is designed for various design points of operation associated with particular speeds of the shafts 32 and 36. For example, for a particular speed of the second shaft 36, the LPC 16 provides the compressed airflow 14a at a predetermined, reference flowrate (either represented by mass flowrate or weight flowrate), temperature, and pressure to the HPC 18. The resulting combustion gases 28 discharged from the combustor 26 to the HPT 30 are provided to the LPT 34 also at predetermined, reference flowrate, temperature, and pressure. These predetermined design characteristics of the HPC 16 and the LPT 34, for example, are selected for particular design point operation based on conventional considerations, including desired output power, thermal efficiency of the engine 10, and preferred stall margins for the compressors 16 and 18.

Figure 2:
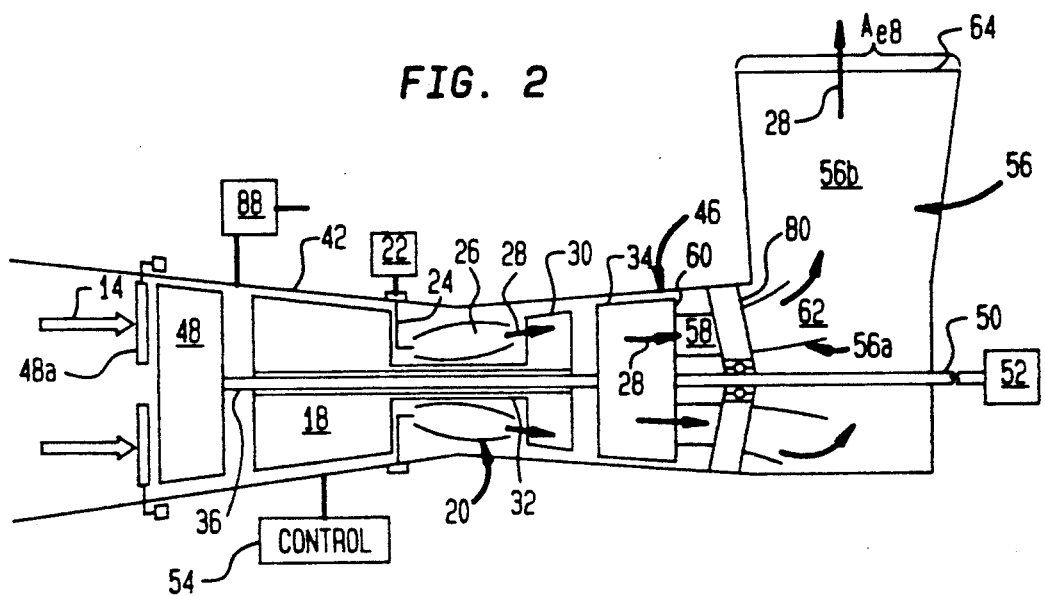
FIG. 2 is a schematic, centerline sectional view of a gas turbine engine derived from the aircraft engine illustrated in FIG. 1 in accordance with one embodiment of the present invention.

Illustrated in FIG. 2 is a gas turbine engine 46 in accordance with one embodiment of the present invention, which is derived from the engine 10 illustrated in FIG. 1, and is therefore referred to as the derivative engine 46. The derivative engine 46 is provided by removing the fan 12 and the LPC 16 from the aircraft engine 10 illustrated in FIG. 1 and substituting therefor an oversized low pressure compressor (LPC), or booster compressor 48. The booster compressor 48 includes a plurality of conventional circumferentially spaced variable inlet guide vanes (VIGVs) 48a which selectively control the amount of airflow 14 channeled through the booster compressor 48. In alternate embodiments of the invention, fixed inlet guide vanes could be used. The derivative engine 46 utilizes the same HPC 18, combustion means 20, HPT 30, and LPT 34 as utilized in the aircraft engine 10 for reducing the number of changes required for providing the derivative engine 46.

The derivative engine 46 includes, in accordance with one embodiment of the present invention, an output shaft 50 which extends, for example, in an aft direction from the LPT 34, with the output shaft 50 being conventionally fixedly secured to the LPT 34 for rotation therewith, and for rotation with the second rotor shaft 36. The output shaft 50 is conventionally attached to a conventional electrical generator 52 which is conventionally connected to a power grid of an electrical utility for providing electrical power at a synchronous frequency of 60 Hertz, for example. the output shaft 50 could alternatively extend out the front of the LPC 48 to a forward placed electrical generator 52.

In order to obtain the preferred 60 Hertz electrical frequency, the output shaft 50 is conventionally operated at a predetermined, synchronous speed of 3600 rpm. Other frequencies may be obtained in other embodiments, such as 50 Hertz at 3000 rpm. A conventional engine control 54 is suitably connected to the derivative engine 46 for controlling its operation. Once the generator 52, and therefore the engine 46, is conventionally locked into the electrical grid, the rotational speed of the shafts 36 and 50 is held by the grid magnetically at the preferred synchronous speed.

In accordance with one feature of the present invention, the derivative engine 46 further includes means for obtaining choked flow, i.e. at a Mach number equal to 1, of the combustion gases 28 channeled through the LPT 34 for increasing shaft horsepower in the output shaft 50 while trading-off a reduction in thermal efficiency of the engine 46. In one embodiment, the choked flow means includes conventional diffusion means 56 for diffusing the combustion gases 28 discharged from the LPT 34.

A gas turbine requires a diffusing exhaust system since high specific work and high efficiency power turbines require moderately high through flow or axial velocities. This high velocity flow will end up downstream of the power turbine in the atmosphere at zero velocity. A diffuser converts this velocity head or kinetic energy into useable increased pressure ratio across the power turbine 34.

The diffusion means 56 includes an annular diffuser 56a having a diffuser inlet annulus 58 of minimum flow area designate disposed $A_{e5}$ immediately adjacent to an outlet 60 of the LPT 34. The diffuser 56 also includes an annular diffuser outlet 62 having a flow area designate conventionally greater than $A_{e5}$. The diffusion means 56 further includes a conventional exhaust collector 56b which additionally diffuses the gases 28 discharged from the outlet 62. The gases are discharged to atmospheric pressure from an exhaust outlet 64 having a maximum flow area designated $A_{e8}$. The ratios of the diffuser maximum flow area $A_{e8}$ over the diffuser minimum flow area $A_{e5}$ and the diffuser discharge area $A_{e7}$ is predetermined for diffusing the combustion gases 28 discharged from the LPT 34 for predeterminedly obtaining choked flow of the combustion gases 28 channeled through the LPT 34 for increasing shaft horsepower in the output shaft 50 while reducing thermal efficiency of the derivative engine 46.

More specifically, the LPT 34 has a conventional inlet flow area designated $A_{e49}$ for receiving the gases 28 from the HPT 30. The area ratio of the outlet 64 to the inlet 58, i.e. $A_{e8}/A_{e5}$ is preselected for obtaining a relatively high area ratio from the outlet 64 to the LPT inlet, i.e. $A_{e8}/A_{e49}$ for obtaining an acceptable amount of diffusion of the gases 28 for reducing backpressure on the LPT 34 for obtaining choked flow of the gases at least in the LPT 34 as further described below. For example, in one analytical design the ratio $A_{e8}/A_{e5}$ was about 4.5 with the ratio $A_{e8}/A_{e49}$ being about 25.

Alternatively, in an embodiment without the diffusing means 56, choked flow of the gases 28 in the LPT 34 may be obtained by conventionally sizing the booster compressor 48 for providing compressed airflow at a predeterminedly high flowrate and pressure. Depending on the particular design application a relatively high level of high pressure airflow may be provided by the LPC 48 to cause choking in the LPT 34.

Figure 3:
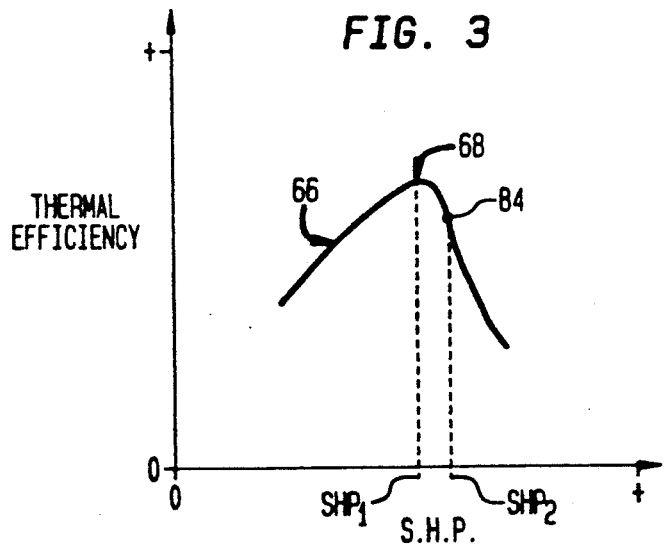
FIG. 3 is a graph plotting thermal efficiency versus output shaft horsepower for the gas turbine engine illustrated in FIG. 2.

Illustrated in FIG. 3 is an analytically based graph plotting thermal efficiency of the derivative engine 46 versus shaft horsepower of the output shaft 50. Thermal efficiency may be defined as useful work output of the engine 46 divided by the energy input, and is proportional to output shaft horsepower divided by the heating value of the fuel and fuel flow rate. A thermal efficiency curve 66 has a maximum thermal efficiency indicated at point 68 associated with a first value of the output shaft horsepower $SHP_1$. A conventional gas turbine engine, such as the aircraft engine 10 illustrated in FIG. 1, would have a similar thermal efficiency curve having a maximum value and such conventional engine is typically designed for operating at about maximum thermal efficiency for reducing fuel consumption, or specific fuel consumption (SFC). Similarly, a conventional M & I engine is also conventionally designed for operating at about maximum thermal efficiency, such as is disclosed in one prior art reference, i.e. U.S. Pat. No. 4,631,914—W. R. Hines, which is assigned to the present assignee. In the Hines patent, a derivative engine is disclosed which in one embodiment has a thermal efficiency greater than the thermal efficiency of the parent aircraft engine.

In accordance with the present invention, the derivative engine 46 shown in FIG. 2 is designed for increasing the output shaft horsepower in the output shaft 50, as well as in the second shaft 36, for generating a corresponding increase in electrical power from the generator 52; while reducing the changes required relative to the parent aircraft engine 10. However, the increased output shaft horsepower is obtained at the expense of a reduction in thermal efficiency of the derivative engine 46 which operates below the maximum efficiency point 68 (see FIG. 3) which could otherwise be obtained. This tradeoff in output shaft horsepower and thermal efficiency is acceptable to the point where the increased power output for powering the generator 52 is offset by the loss in thermal efficiency for maintaining a net economic advantage.

Figure 4:
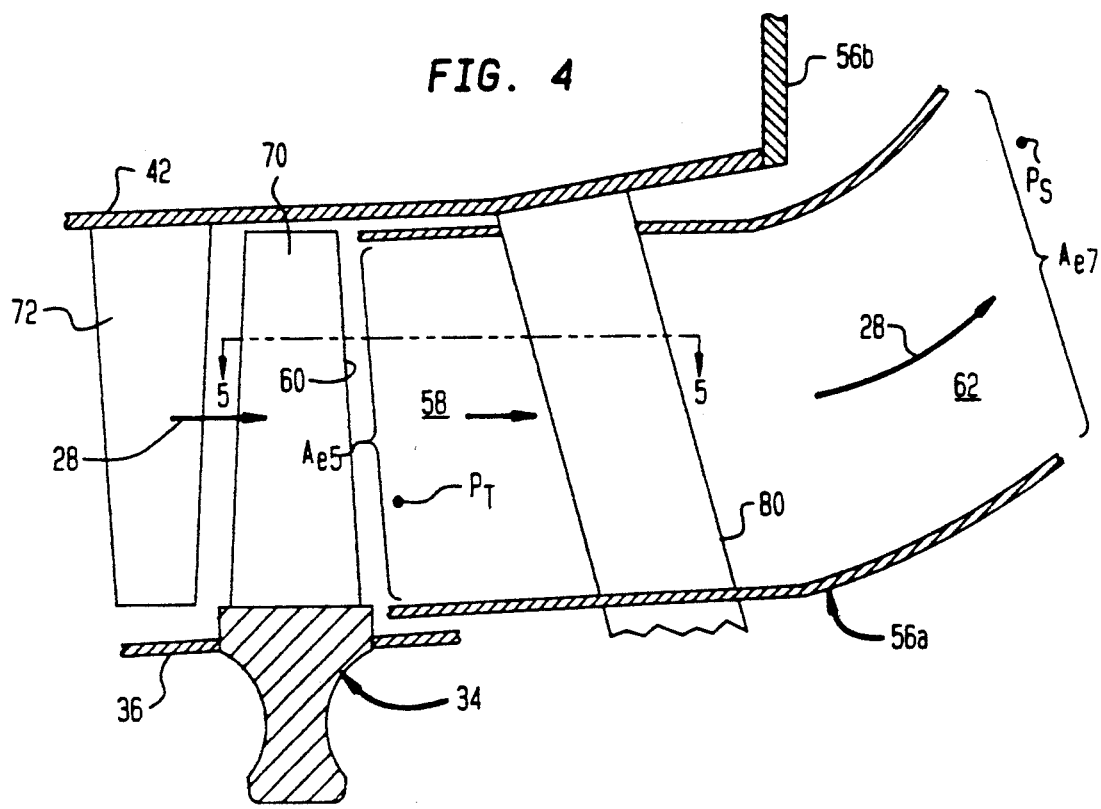
FIG. 4 is an enlarged, sectional view of diffusion means extending from the power turbine illustrated in FIG. 2 in accordance with one embodiment of the present invention.
Figure 5:
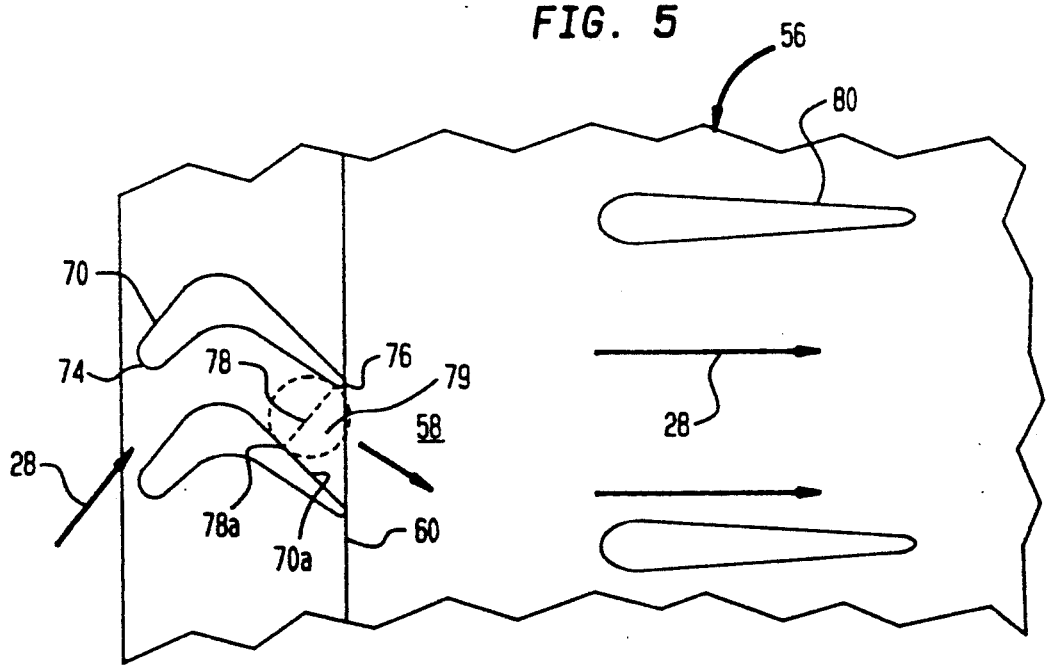
FIG. 5 is a sectional view of a portion of the power turbine and diffusion means illustrated in FIG. 4 taken along line 5—5.

FIGS. 4 and 5 illustrate in more particularity the diffuser 56a and the portion of the LPT 34 adjacent thereto. The LPT 34 conventionally includes a plurality of circumferentially spaced rotor blades 70 at an aft end thereof with a corresponding row of conventional stator vanes 72 disposed upstream therefrom. Each of the blades 70 includes a leading edge 74 and a trailing edge 76, and adjacent ones of the blades define a respective rotor throat 78 of minimum flow area therebetween. In this embodiment, each of the throats 78 is defined as the diameter of contact of a circle contacting the trailing edge 76 of one blade 70 and a point 78a on the suction surface of an adjacent blade 70 disposed upstream of its trailing edge 76. The trailing edges 76 define the LPT outlet 60. Extending downstream from the rotor throat 78 between adjacent blades 70 is a local flow expansion region 79 extending to the LPT outlet 60 along an aft, suction-side, surface 70a of each blade 70.

The diffuser inlet annulus 58 is conventionally located immediately downstream from the LPT outlet 60 for receiving the combustion gases 28 therefrom. A plurality of circumferentially spaced diffusing frame struts 80 extend from the casing 42 radially inwardly for supporting the second rotor shaft 36 and the output shaft 50. The struts 80 are spaced downstream from the LPT outlet 60 and extend through the diffuser 56. The diffuser 56a, including the struts 80 extending therethrough, is conventionally sized and three dimensionally shaped for having preferably a progressively increasing flow area from the diffuser inlet annulus 58 ($A_{e5}$) to the diffuser outlet 62 ($A_{e7}$). Further conventional diffusion takes place from the outlet 62 to the outlet 64 (see FIG. 2) of the exhaust collector 56b for bringing the combustion gases 28 to atmospheric pressure. Due to the oblique design of the discharge annulus 62, it will be understood that the flow area from the diffusor inlet annulus 58 to the outlet 64 may have a local decrease in flow area, rather than having a continuously increasing area.

In accordance with one feature of the present invention, the diffuser 56a and exhaust collector 56b are effective for reducing static pressure $P_s$ at the diffuser inlet annulus 58 for obtaining choked flow, i.e., flow at Mach number equal to 1 at either the throats 78, the diffuser inlet 58 or both. The diffuser 56a works in conjunction with the exhaust collector 56b for conventionally diffusing the gases 28 for decreasing the velocity thereof as the gases flow through the diffuser 56a and collector 56b while correspondingly increasing the static pressure thereof and reducing the total pressure losses. Thus the total pressure ratio across the LPT 34 is increased.

By reducing the static pressure $P_s$ at the diffuser inlet annulus 58, the pressure ratio of the gases 28 flowing past the blades 70 and through the diffuser 56a is correspondingly increased predeterminedly for obtaining choked flow at least at the rotor throat 78 from root-to-tip of each of the blades 70. In the preferred embodiment, choked flow of the combustion gases 28 is also obtained in the diffuser inlet annulus 58 with local supersonic flow of the gases 28 in the region 79 downstream of the rotor throat 78.

In the exemplary embodiment, the gases 28 flow at an absolute Mach number equal to 1 in the diffuser inlet annulus 58 and are also flowing at rotor relative Mach number equal to 1 at the rotor throat 78, while downstream of the rotor throat 78 the local Mach numbers are greater than 1 in the flow expansion region 79. The blade aft surfaces 70a are available for additional energy extraction by pressure forces acting thereon. Depending upon the particular design, including losses in the flow expansion region 79, it is possible that either more or less energy extraction capability (/H/T) relative to rotor choke may be realized from either supercharging or diffusion.

In a conventional LPT 34, as utilized in the aircraft engine 10, the gases 28 flowing through the rotor throat 78 flow at up to about Mach number equal to 0.80 with the gases flowing through the inlet annulus 58 at correspondingly low Mach numbers of about Mach number equal to 0.45. By utilizing the diffusing means 56 in accordance with one feature of the present invention, the resultant higher flowrates with choked flow allow the LPT 34 to operate for producing increased shaft horsepower from the output shaft 50 but with reduced thermal efficiency as shown for example in FIG. 3 and further described below.

Furthermore, in a preferred embodiment, the booster compressor 48 is predeterminedly sized, or oversized, for supercharging the LPT 34 at the predetermined synchronous speed, for example 3600 rpm, of the output shaft 50. For example, the LPC 48 may be oversized by sizing and positioning the VIGVs 48a for increasing flowrate of the airflow 14 and pressure ratio of the LPC 48 while operating the LPC 48 along its maximum allowable operating line without stalling. The LPC 48 is preferably sized so that at the same combustion gas temperature in the combustor 26 as in the parent aircraft engine 10, the LPC 48 provides higher pressure ratio and higher flowrates to the HPC 18 at the synchronous speed.

By supercharging the LPT 34, the combustion gases 28 are provided at predetermined, relatively higher flowrates and pressure at the synchronous speed, as compared to the operation thereof in the conventional aircraft engine 10 at the same combustion temperature, and more work may be obtained from the LPT 34 for providing increased output shaft horsepower. The amount of supercharging of the LPT 34 is limited by practical considerations, including the tradeoff between the increased output shaft horsepower and the decrease in thermal efficiency, as well as any conventional limitations such as acceptable life of the derivative engine 46, and acceptable torque from the LPT 34, and acceptable levels of temperature in the derivative engine 46 without undesirably adversely affecting the useful life of the materials therein.

As indicated above, the derivative engine 46 is derived from the aircraft engine 10 and includes an identical LPT 34. It should be understood, however, that a modified LPT could be utilized to allow cycle optimization (e.g., differently angled first stage nozzle vanes to alter flow function). The LPT 34 was originally designed for application in the aircraft engine 10 to be predeterminedly sized for extracting energy from the combustion gases 28 channeled to the LPT 34 from the HPT 30 at reference flowrate, temperature, and pressure preselected for obtaining a corresponding reference shaft horsepower from the second rotor shaft 36 at a reference thermal efficiency of the aircraft engine 10 at the predetermined speed, for example, the synchronous speed of 3600 rpm. For example, the reference thermal efficiency of the gas turbine engine 10 is the maximum thermal efficiency 68 illustrated in FIG. 3.

In accordance with one feature of the present invention, the booster compressor 48 is predeterminedly sized and configured for providing the compressed airflow 14 therefrom to the core compressor 18 so that the combustion gases 28 channeled to the LPT 34 have a flowrate and pressure greater than the reference flowrate and pressure, respectively, for supercharging the LPT 34. The booster compressor 48, therefore, provides increased flowrate, for example by opening the VIGVs 48a, to the core compressor 18 and the combustor 26, and additional fuel may be mixed therewith from the injectors 24 for providing the exhaust gases 28 with increased energy. The increased energy in the exhaust gases 28 may then be extracted from the LPT 34 for driving the booster compressor 48, having increased power requirements, as well as the output shaft 50 at increased shaft horsepower, for example, at a second value of shaft horsepower $SHP_2$ as illustrated in FIG. 3 which is greater than the first value $SHP_1$. The derivative engine 46 is preferably operated at or above the increased output shaft horsepower $SHP_2$ which corresponds with the thermal efficiency of the engine 46 at a reduced value associated with choked flow designated as point 84.

More specifically, the point 84 represents a condition wherein the LPT 34 is at its maximum energy extraction capability associated with rotor choke, i.e. choking of the gases 28 at the throats 78. Energy extraction is defined as the change in enthalpy (/H) across the LPT 34 divided by total temperature (T) of the gases 28 at the inlet to the LPT 34 in BTU/lb-°R. The LPT 34 may alternatively be operated at its maximum energy extraction in other embodiments corresponding with annulus choke, i.e. choking of the gases 28 in the inlet annulus 58. In either embodiment, choked flow of the gases 28 occurs at least in the LPT 34 at rotor throat 78 or inlet annulus 58 with an increase in shaft horsepower and reduction in thermal efficiency.

The loss of thermal efficiency in the derivative engine 46 occurs in part due to the generation of shock waves, for example in the diffusion means 56 due to the choked flow in the diffuser annulus 58 which has an increased value of total pressure $P_T$ and static pressure $P_S$ which must be reduced to atmospheric pressure in the exhaust stack 64.

Analysis of the derivative engine 46 indicates for example that at the point 84, about a 5% increase in shaft horsepower of the output shaft 50 may be obtained as compared to operation at the point 68. A corresponding loss of thermal efficiency of about 2% occurs with a corresponding increase in the total pressure $P_T$ at the diffuser annulus 58, also as compared to an engine without choked flow in the inlet annulus 58 or oversized booster compressor 48 presented by point 68. Further increases in output shaft horsepower can be obtained by supercharging the choked LPT 34 and operating on the curve 66 to the right of point 84 with corresponding decrease in thermal efficiency down to a level of about 36%, at which relatively low efficiency net economic advantages may not be significant.

As described above, the HPC 18 through the LPT 34 of the derivative engine 46 are identical to the respective structures in the aircraft engine 10. In the aircraft engine 10, the conventional LPC 16, which may alternatively be referred to as a reference LPC, was predeterminedly sized and configured for obtaining predetermined design flowrate, temperature, and pressure at the predetermined, synchronous speed. The booster 48 of the derivative engine 46 is predeterminedly oversized relative to the LPC 16 for providing the compressed airflow 14 to the core compressor 18 at a predetermined flowrate, temperature, and pressure which are greater than the predetermined design flowrate, temperature, and pressure of the reference LPC 16 at the same reference combustion temperature.

The oversized booster compressor 48, including the VIGVs 48a, is effective for providing higher energy combustion gases 28 to the unmodified LPT 34 for loading the LPT 34 as high as possible to the diffuser annulus choke condition, and then further energizing the combustion gases 28 such that more flow, pressure, and temperature are entering the HPC 18. This results in increased, or maximized for example, cycle temperatures from the booster compressor 48 through the LPT 34, with a respective increase in output shaft horsepower. The LPT 34 is then driving both the booster compressor 48 at its higher power requirement at the synchronous rotor speed, and is also providing more output shaft horsepower while running at increased total pressure $P_T$ at the LPT outlet 60. The exhaust stack 64 then discharges the combustion gases 28 at higher Mach numbers with more energy resulting in lowered thermal efficiency of the derivative engine 46.

Accordingly, increased output shaft horsepower is obtained in the derivative engine 46 with relatively few changes as compared to the parent aircraft engine 10. For example, additional stages in the LPT 34 for extracting more energy need not be required, therefore keeping the LPT 34 as an original component. Furthermore, in a conventional M & I engine having a conventional exhaust stack, the exhaust stack 64 is typically designed for obtaining relatively high levels of static pressure recovery in the combustion gases 28 channeled therethrough. In accordance with another feature of the present invention, since static pressure recovery at the choked condition in the diffuser annulus 58 is not a significant factor in view of the desire for increased output shaft horsepower, a relatively simple and inexpensive exhaust collector 56b and diffuser 56a may be utilized instead. However, the exhaust collector 56b should be suitably structurally sound for accommodating the increased Mach numbers of the exhaust gases 28 channeled therethrough and may include suitable exhaust silencing structures if desired.

Referring again to FIG. 2, the derivative engine 46 further includes in the preferred embodiment conventional means 88 for bleeding a portion of the airflow 14 channeled through the booster compressor 48 for maintaining acceptable booster compressor stall margin upon decreasing core throttle at the synchronous speed. The conventional VIGVs 48a in the booster compressor 48 are also used in the preferred embodiment for maintaining acceptable stall margins and varying air capacity and flow rates.

The exemplary derivative gas turbine engine 46 described above is one embodiment for carrying out the improved method of operating a gas turbine engine for a peaking power requirement, for example. The method includes the steps of providing the combustion gases 28 to the LPT 34, and diffusing the combustion gases discharged from the LPT 34 for obtaining choked flow of the combustion gases 28 for increasing shaft horsepower from the output shaft 50 while reducing thermal efficiency of the engine 46.

In the preferred embodiment, the method also includes the step of supercharging the LPT 34 while maintaining the choked flow. In the preferred embodiment, the booster compressor 48 is operated for providing the compressed air 14 at a flowrate and pressure for obtaining a thermal efficiency of the engine less than a reference maximum efficiency at the synchronous speed of the output shaft 50 for increasing shaft horsepower from the output shaft 50.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

For example, although a two-rotor engine has been disclosed, the invention is applicable to other types of gas turbine engines including those with one or three rotors. Although a radial diffuser 56a is shown a conventional axial diffuser could also be used. The diffuser 56a could also be used without the collector 56b, with diffusion occurring solely therein. Yet in other embodiments, a diffuser need not be used at all, but instead choked flow with supercharging may be obtained by using the booster compressor suitably sized and/or the core compressor suitably sized.

Accordingly, what is desired to be secured by Letters Patent of the United States is the invention as defined and differentiated in the following claims:

1. A gas turbine engine comprising:
   an output shaft;
   compression means for compressing air;
   combustion means for adding fuel to compressed airflow from said compression means and generating combustion gases;
   turbine means for extracting energy from said combustion gases for powering said compression means and said output shaft;
   means for obtaining choked flow of said combustion gases channeled through said turbine means for increasing shaft horsepower in said output shaft; and
   said compression means being effective for supercharging said turbine means at a predetermined speed of said output shaft for increasing said shaft horsepower while obtaining a decrease in thermal efficiency of said engine below a maximum thermal efficiency thereof.

2. A gas turbine engine according to claim 1 wherein said choked flow means comprises said compression means being sized for providing compressed airflow at a predetermined flowrate and pressure for obtaining said choked flow.

3. A gas turbine engine according to claim 1 wherein said choked flow means comprises diffusion means for diffusing said combustion gases from said turbine means.

4. A gas turbine engine according to claim 3 wherein said compression means includes a booster compressor and a core compressor; said turbine means includes a high pressure turbine (HPT) operatively connected to said core compressor for rotation therewith and disposed downstream of said combustion means for receiving said combustion gases, and a low pressure turbine (LPT) operatively connected to said booster compressor for rotation therewith and disposed downstream of said HPT for receiving said combustion gases therefrom; said output shaft is fixedly connected to said LPT for rotation therewith; and said diffusion means extends downstream from said LPT.

5. A gas turbine engine according to claim 4, wherein said booster compressor is sized and configured for providing said compressed airflow to said core compressor at a predetermined flowrate, temperature, and pressure for supercharging said LPT at a predetermined speed of said output shaft while maintaining said choked flow of said combustion gases.

6. A gas turbine engine according to claim 5 wherein:
said LPT includes a plurality of circumferentially spaced rotor blades at an aft end thereof, each of said blades including a leading edge and a trailing edge and adjacent ones of said blades defining a rotor throat of minimum flow area therebetween;
said diffusion means includes a diffuser inlet annulus of minimum flow area adjacent to said LPT rotor blade trailing edges for receiving said combustion gases therefrom; and
said diffusion means is effective for obtaining said choked flow at least at said LPT rotor throat.

7. A gas turbine engine according to claim 6 wherein said diffusion means is effective for obtaining said choked flow at said diffuser inlet annulus.

8. A gas turbine engine according to claim 7 wherein said diffusion means is effective for obtaining supersonic flow downstream of said LPT rotor throat.

9. A gas turbine engine according to claim 5 wherein said LPT is sized for extracting energy from said combustion gases channeled thereto from said HPT at reference flowrate and pressure preselected for obtaining a reference shaft horsepower from said output shaft at a reference thermal efficiency of said gas turbine engine, and said booster compressor is sized for providing said compressed airflow to said core compressor so that said combustion gases channeled to said LPT have a flowrate and pressure greater than said reference flowrate and pressure, respectively, for supercharging said LPT for obtaining shaft horsepower from said output shaft greater than said reference shaft horsepower at said predetermined speed.

10. A gas turbine engine according to claim 5 wherein said core compressor, combustion means, HPT, and LPT are an existing design having predetermined design flowrate, temperature, and pressure characteristics, and said booster compressor is sized and configured for providing said compressed airflow to said core compressor for exceeding said predetermined design characteristics at said predetermined speed.

11. A gas turbine engine according to claim 10 wherein said predetermined speed is a synchronous speed associated with electrical power generation.

12. A gas turbine engine according to claim 11 wherein said output shaft is effective for driving an electrical generator and said synchronous speed is 3600 rpm.

13. A gas turbine engine according to claim 10 wherein said existing design includes a reference low pressure compressor (LPC) disposed upstream of said core compressor, and said booster compressor is sized and configured for providing said compressed airflow to said core compressor at said predetermined flowrate, temperature and pressure which are greater than said predetermined design flowrate, temperature and pressure of said reference LPC at said predetermined speed.

14. A gas turbine engine according to claim 5 wherein said diffusion means includes an annular diffuser having a diffuser inlet annulus of minimum flow area adjacent to an outlet of said LPT, an outlet of maximum flow area, and progressively increasing flow area therebetween.

15. A gas turbine engine according to claim 14 Wherein said diffusion means further includes an exhaust collector for receiving said combustion gases discharged from said diffuser.

16. A gas turbine engine according to claim 15 wherein said diffusion means is effective for reducing static pressure at said diffuser inlet annulus for obtaining said choked flow.

17. A gas turbine engine according to claim 15 wherein:
said LPT includes a plurality of circumferentially spaced rotor blades at an aft end thereof, each of said blades including a leading edge and a trailing edge, and adjacent ones of said blades defining a rotor throat of minimum flow area therebetween and an LPT outlet at said trailing edges;
said diffusion means includes an annular diffuser having a diffuser inlet annulus of minimum flow area adjacent to said outlet of said LPT, and a diffuser outlet of maximum flow area, and said diffusion means is effective for obtaining said choked flow at least at said rotor throat.

18. A gas turbine engine according to claim 17 wherein said diffusion means includes an exhaust stack for receiving said combustion gases discharged from said diffuser, said exhaust stack and diffuser being effective for reducing static pressure at said diffuser inlet annulus for obtaining said choked flow.

19. A gas turbine engine according to claim 18 wherein said core compressor, combustion means, HPT, and LPT are an existing design, said existing design including a reference low pressure compressor (LPC) disposed upstream of said core compressor, having predetermined design flowrate, temperature, and pressure characteristics;
said booster compressor is sized and configured for providing said compressed airflow to said core compressor at said predetermined flowrate, temperature and pressure which are greater than said predetermined design flowrate, temperature and pressure of said reference LPC at said predetermined speed; and
said LPT is predeterminedly sized for extracting energy from said combustion gases channeled thereto from said HPT at a reference flowrate, temperature, and pressure preselected for obtaining a reference shaft horsepower from said output shaft at a reference thermal efficiency of said gas turbine engine existing design, said combustion gases channeled to said LPT having a flowrate, temperature, and pressure greater than said reference flowrate, temperature, and pressure, respectively, for supercharging said LPT for obtaining shaft horsepower from said output shaft greater than said reference shaft horsepower at said predetermined speed.

20. A gas turbine engine according to claim 19 wherein said output shaft is effective for driving an electrical generator and said predetermined speed is a synchronous speed of 3600 rpm.

21. A method of operating a gas turbine engine including an output shaft, compression means for compressing air, combustion means for adding fuel to compressed airflow from said compressing means and generating combustion gases, and turbine means for extracting energy from said combustion gases for powering said compression means and said output shaft, comprising the steps of:
providing said combustion gases to said turbine means;
choking flow of said combustion gases channeled through said turbine means for increasing shaft horsepower in said output shaft; and
supercharging said turbine means while maintaining said choked flow for increasing said shaft horsepower while obtaining a decrease in thermal efficiency of said engine below a maximum thermal efficiency thereof.

22. A method of operating a gas turbine engine according to claim 21 wherein said choking flow step includes diffusing said combustion gases from said turbine means.

23. A method of operating a gas turbine engine according to claim 21 wherein said choking flow step includes increasing flowrate and pressure of said compressed airflow for choking said combustion gases channeled through said turbine means.

24. A method of operating a gas turbine engine according to claim 21 wherein said supercharging step includes increasing pressure of airflow channeled through said compression means.

25. A method of operating a gas turbine engine according to claim 21 said compression means comprises a booster compressor and a core compressor and said supercharging step includes accelerating said core compressor to a predetermined speed for increasing flow of said combustion gases to said turbine means.

26. A method of operating a gas turbine engine according to claim 21 wherein said compression means comprises a booster compressor and a core compressor, said turbine means comprises a high pressure turbine (HPT) operatively connected to said core compressor for rotation therewith and disposed for receiving combustion gases from said combustion means, and a low pressure turbine (LPT) operatively connected to said booster compressor for rotation therewith and disposed for receiving said combustion gases from said HPT, and said diffusing step diffuses said combustion gases from said LPT for obtaining choked flow and said supercharging step includes said booster compressor being operated for providing said compressed airflow at a pressure and flowrate for increasing shaft horsepower from said output shaft.

* * * * *